United States Patent
Sciulli et al.

[11] Patent Number: 6,135,390
[45] Date of Patent: Oct. 24, 2000

[54] WHOLE-SPACECRAFT HYBRID ISOLATION SYSTEM FOR LAUNCH VEHICLES

[75] Inventors: Dino Sciulli; Steven F. Griffin, both of Albuquerque, N. Mex.

[73] Assignee: The United States of America as represented by the Secretary of the Air Force, Washington, D.C.

[21] Appl. No.: 09/277,595

[22] Filed: Mar. 26, 1999

[51] Int. Cl.$^7$ ..................................................... B64G 1/22

[52] U.S. Cl. ..................... 244/158 R; 244/1 R; 248/566; 267/140.11

[58] Field of Search ............................. 244/1 R, 158 R; 248/566, 603, 604; 267/140.11, 140.13, 161, 136

[56] References Cited

U.S. PATENT DOCUMENTS 5,845,236  12/1998  Jolley et al. ............................. 267/136
6,009,985   1/2000  Ivers ....................................... 267/136

*Primary Examiner*—Peter M. Poon
*Assistant Examiner*—Tien Dinh
*Attorney, Agent, or Firm*—Kenneth E. Callahan

[57] ABSTRACT

A whole-spacecraft passive isolation system consisting of a plurality of titanium flexures that act as soft springs to isolate a satellite from its launch vehicle is improved by the addition of piezoceramic wafers attached to the flexures. A low-pass filter feedforward controller is used to cancel out disturbances by applying out-of-phase signals to the piezoceramic wafers thereby creating a hybrid isolation system that significantly reduces the dynamic loads on the spacecraft.

3 Claims, 5 Drawing Sheets

WHOLE-SPACECRAFT HYBRID ISOLATION SYSTEM FOR LAUNCH VEHICLES

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention is in the field of launch vehicle/spacecraft isolation systems, and in particular, relates to a combined active/passive system to isolate a spacecraft from its launch vehicle.

2. Description of the Prior Art

It has been shown that the launch environment is the worst loading condition that a satellite will ever see during its lifetime. Since launch environments account for much of the expense in designing, qualifying, and testing spacecraft components, significant costs can be saved if these loads are reduced. Also, with today's promise of lighter and cheaper satellites, reducing launch loads is a necessary step in achieving these goals. When satellites become smaller and lighter, smaller launch vehicles can be used which further reduce launch costs, but at the expense of a harsher ride to orbit compared with a larger sized launch vehicle. For a satellite to survive the launch environment, the traditional approach in the satellite design is to structurally stiffen the satellite. This is a very inefficient way to design satellites considering the fact that a kg of mass costs thousands of dollars to put into space. Also, since the total spacecraft weight is restricted, increasing bus structural or instrument weight to survive the launch environments will significantly decrease the mission of the satellite.

Another approach for the satellite to survive the launch environment is to reduce the dynamics to auxiliary components by incorporation of passive damping or local isolation. However, these approaches are spacecraft-specific and invariably add time and cost to the spacecraft development. A whole-spacecraft isolator, on the other hand, can reduce launch environments to the whole satellite and can be tunable for any shape or size of satellite. Once the launch loads are reduced, the satellite can be designed to these lower loads which will save satellite mass.

The Boeing Company's Launch Vibration Isolation System (LVIS) was an all-active whole-spacecraft isolation system for the larger launch vehicles such as their Delta-II. LVIS concept had significant drawbacks since it used hydraulics and air springs, which tend to leak over a period of time. This becomes extremely significant when the system has to sit on a launch pad up to weeks in advance of the launch.

SUMMARY OF THE INVENTION

CSA Engineering has designed a whole-spacecraft passive isolation system with significant performance increases. The present invention is an improvement on the CSA passive system using active components. The CSA design consists of a plurality of titanium flexures that act as soft springs to isolate a satellite from its launch vehicle. The improvement consists of the placement of four piezoceramic wafers electrically connected in parallel at high strain areas of each isolator (titanium flexure). A low-pass filter feedforward controller is used to cancel out disturbances by applying an out-of-phase signal to the piezoceramics on the isolators. The hybrid whole spacecraft isolator system produces a 30-fold decrease in the critical isolator mode compared to the passive system at an insignificant increase in weight. The system adapts to the dynamic environment during the launch with both broadband and narrowband attenuation.

DESCRIPTION OF THE PREFERRED EMBODIMENT

Figure 1:
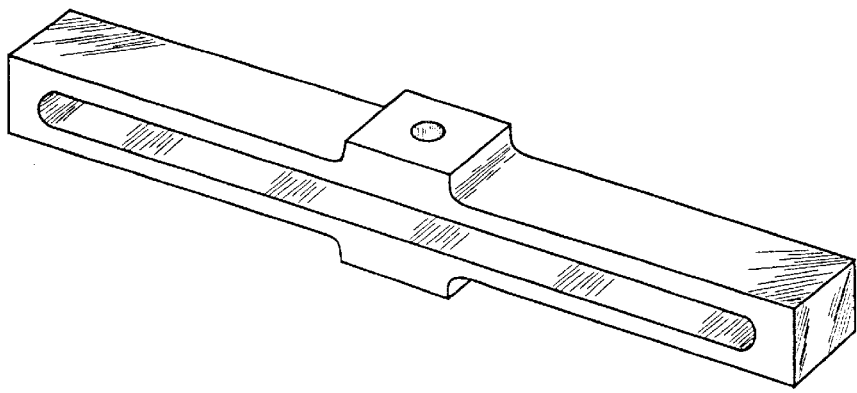
FIG. 1 shows a single piece of the CSA Engineering passive isolator system.
Figure 2:
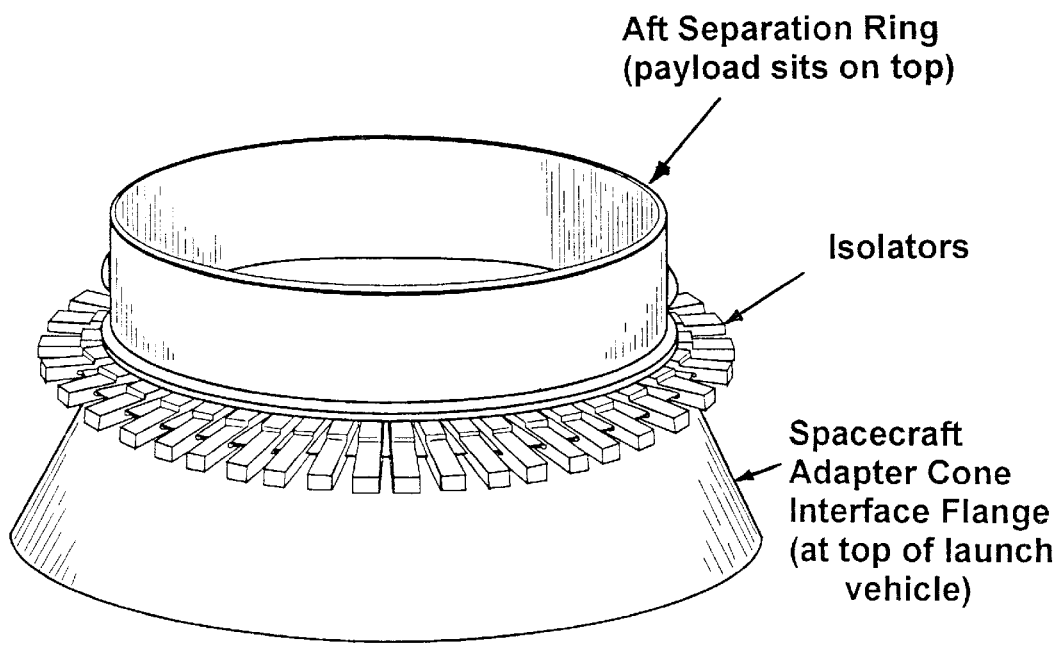
FIG. 2 is a photo showing the location of the isolator system within the launch vehicle shroud of the GFO satellite.

A single titanium flexure component of the CSA Engineering, Inc. launch isolation system is shown in FIG. 1. This passive isolation system was designed for the Taurus/GeoSat Follow-ON (GFO) mission and consisted of 58 of these individual isolators arranged in a ring. The system is positioned between the upper stage of the launch vehicle and the satellite as shown in FIG. 2. The performance of this system obtained at least a factor of two reduction in overall loads.

Figure 3:
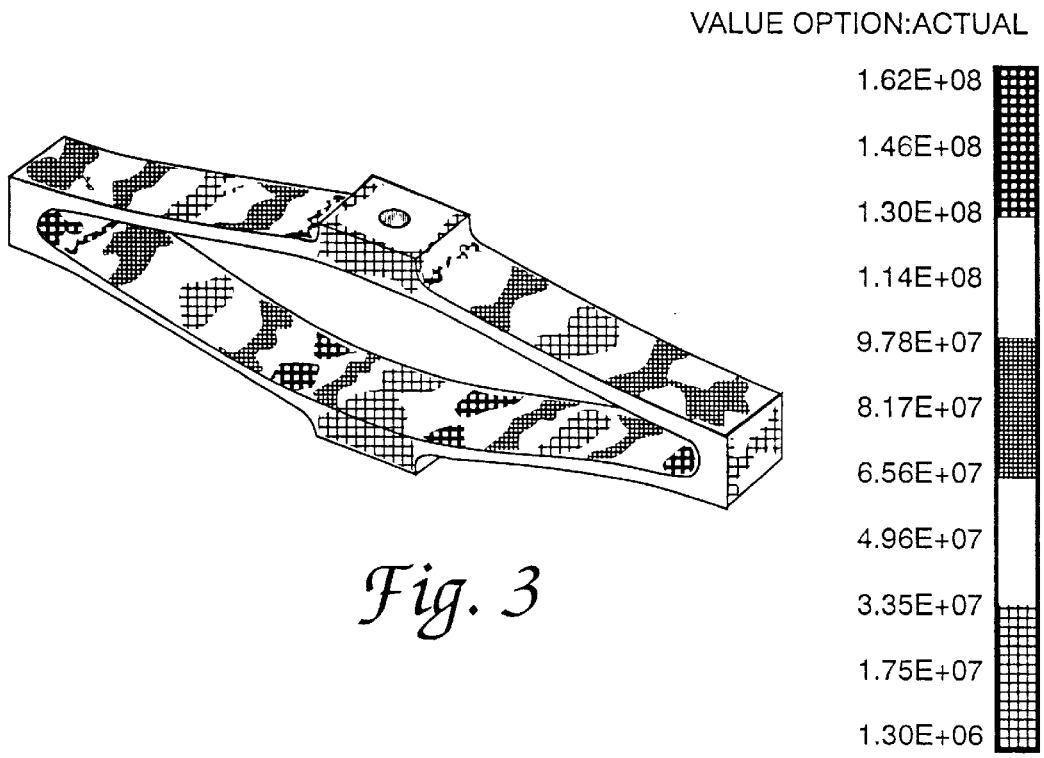
FIG. 3 shows a detailed stress analysis of an isolator flexure used for placement of the piezoceramic wafers.

The hybrid isolator system of the present invention is an enhancement to the CSA design. A preliminary analysis was performed to determine the optimal locations of the piezoceramic wafers. A detailed design of the above isolator was done using an FEM code. The stress analysis is shown in FIG. 3. In this figure, the high stress areas are shown by red and decreasing stresses are given by the colors yellow, green, light blue and dark blue. From this analysis it was determined that the optimal location for the piezoceramic wafers is near the attachment point (middle of isolator).

Figure 4:
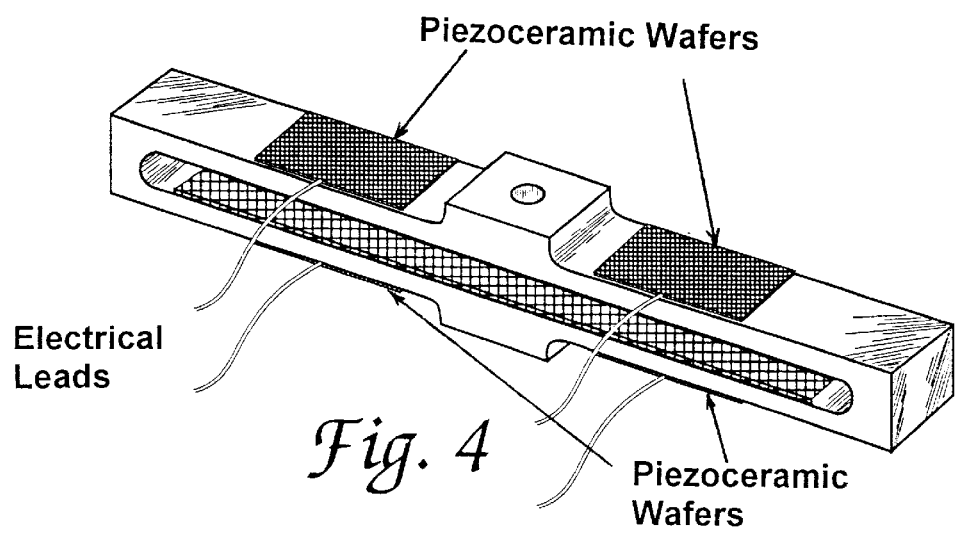
FIG. 4 shows the placement of the piezoceramic wafers on the flexure.

The final hybrid design for an individual flexure is shown in FIG. 4. Four piezoceramics wafers are used and are electrically connected in parallel. In this manner, the voltage applied to the wafers will simultaneously go to each individual piezoceramic wafer. The actuators are placed in parallel to the passive system so if the active components fail, the passive system will take over.

Figure 5:
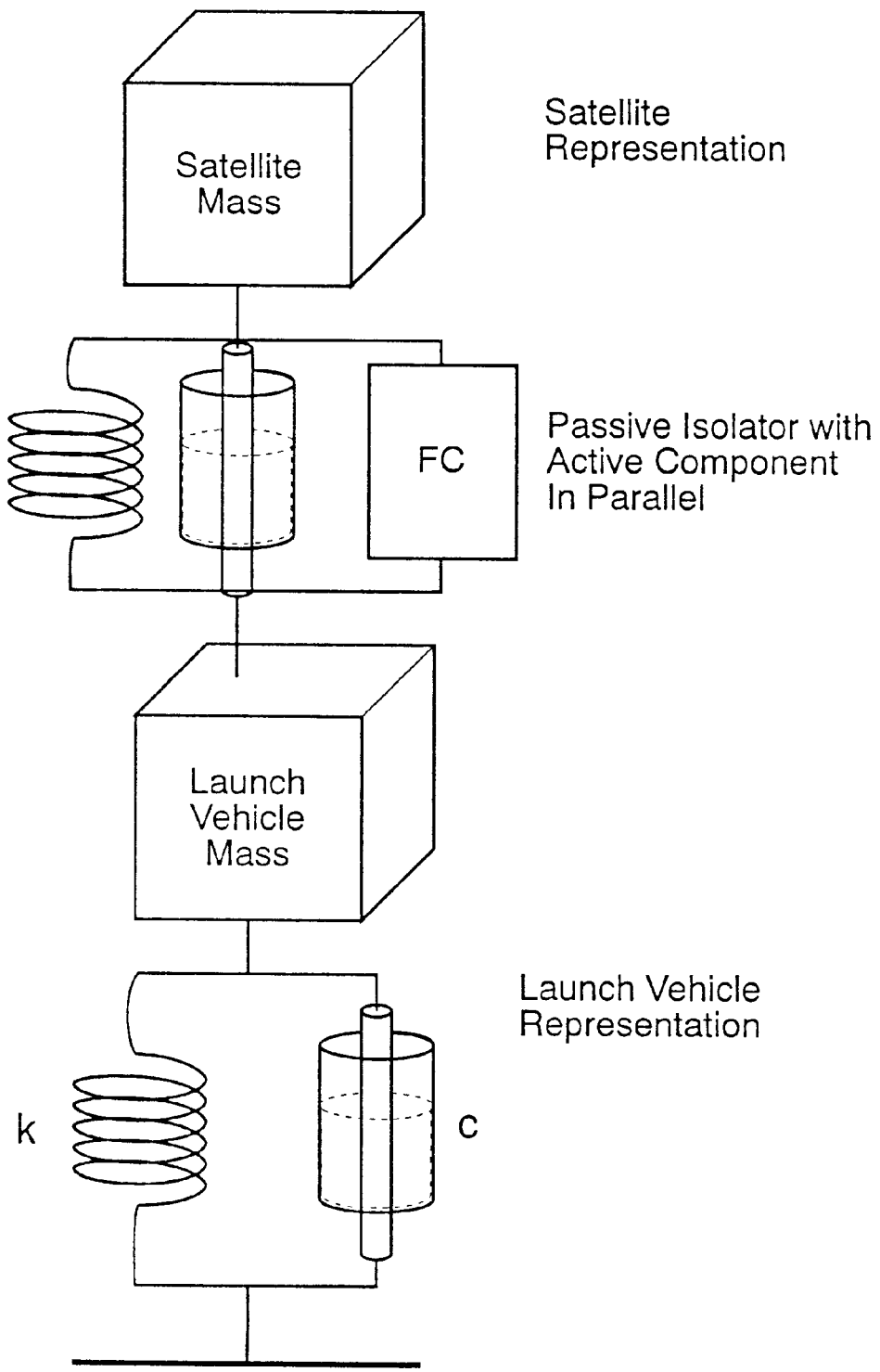
FIG. 5 is a spring-mass model of the hybrid whole-spacecraft isolation system.

The conceptual design of the hybrid system is given in FIG. 5. The dynamics of the launch vehicle are simply represented in this figure by a mass-spring-damper system and two parts represent the dynamics of the isolator: a passive part and an active part. A spring and damper represent the dynamics of the passive isolator and an isolator force represents the active part of the isolator. It is assumed that the mass and stiffness associated with the isolator force do not significantly affect the dynamics of the hybrid system. There are also dynamics due to the satellite which are not represented in this figure.

Figure 6:
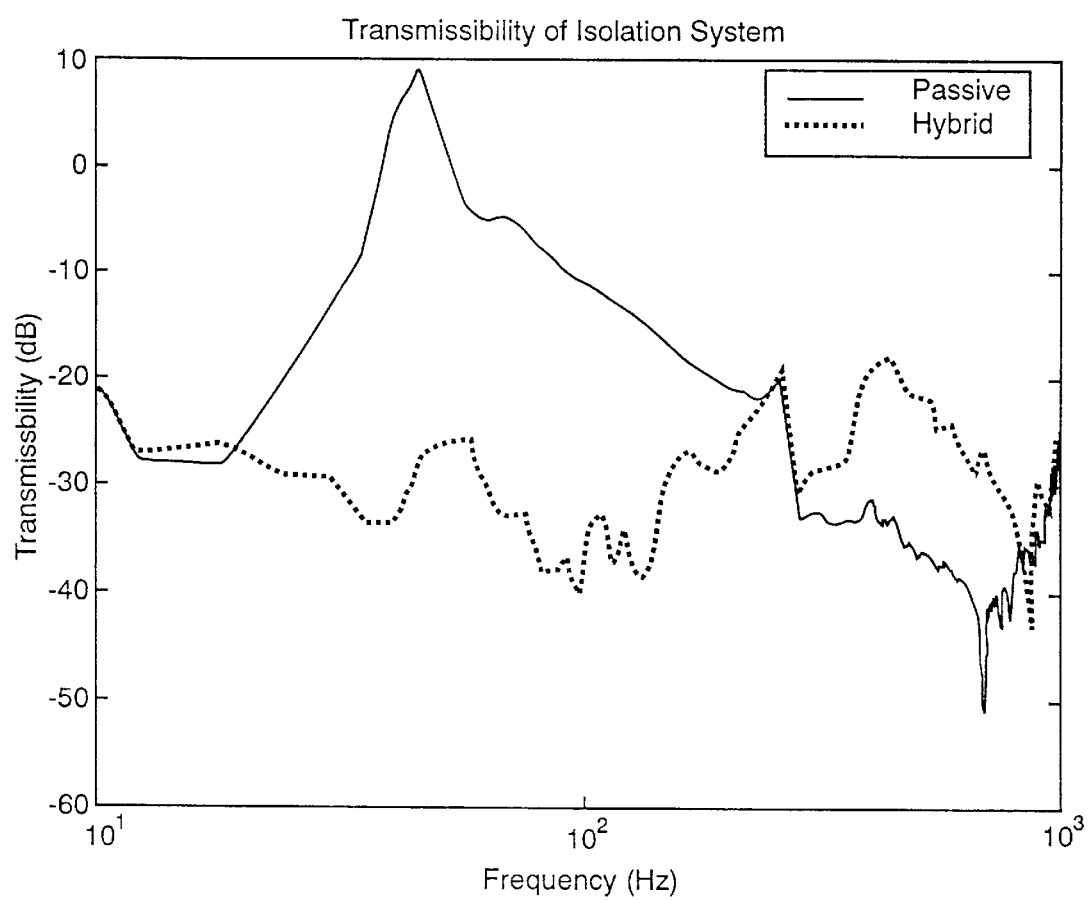
FIG. 6 is a transmissibility comparison between the hybrid and the passive systems.

Experimental results with prototype hardware show that the hybrid system attenuates the most critical mode, that is, the isolator mode. This mode is reduced by a factor of 32 (30 dB) as shown in FIG. 6. This attenuation was achieved by using a fourth-order low-pass feed-forward filter. With this simple controller, more broadband attenuation occurs in the frequency range of 20–250 Hz than with the passive system. It should also be noted that the hybrid system does slightly increase the transmissibility in some of the higher frequencies. However, the transmissibility of the hybrid system is still significantly less than a system with no isolation. Also, implementing a different type of controller such as a linear quadratic gaussian controller or an adaptive neural controller, attenuation can still be achieved in the lower frequency range without increasing the transmissibility in some of the higher frequency ranges. The use of a controller such as an adaptive neural controller offers a significant advantage over a passive isolation system. For instance, the adaptive neural controller can be used as an autonomous controller where the performance of the system adapts to the changing environments of the launch vehicle. These changes can be significant since the launch loads can significantly vary as the launch vehicle goes through its various stages to orbit.

Figure 7:
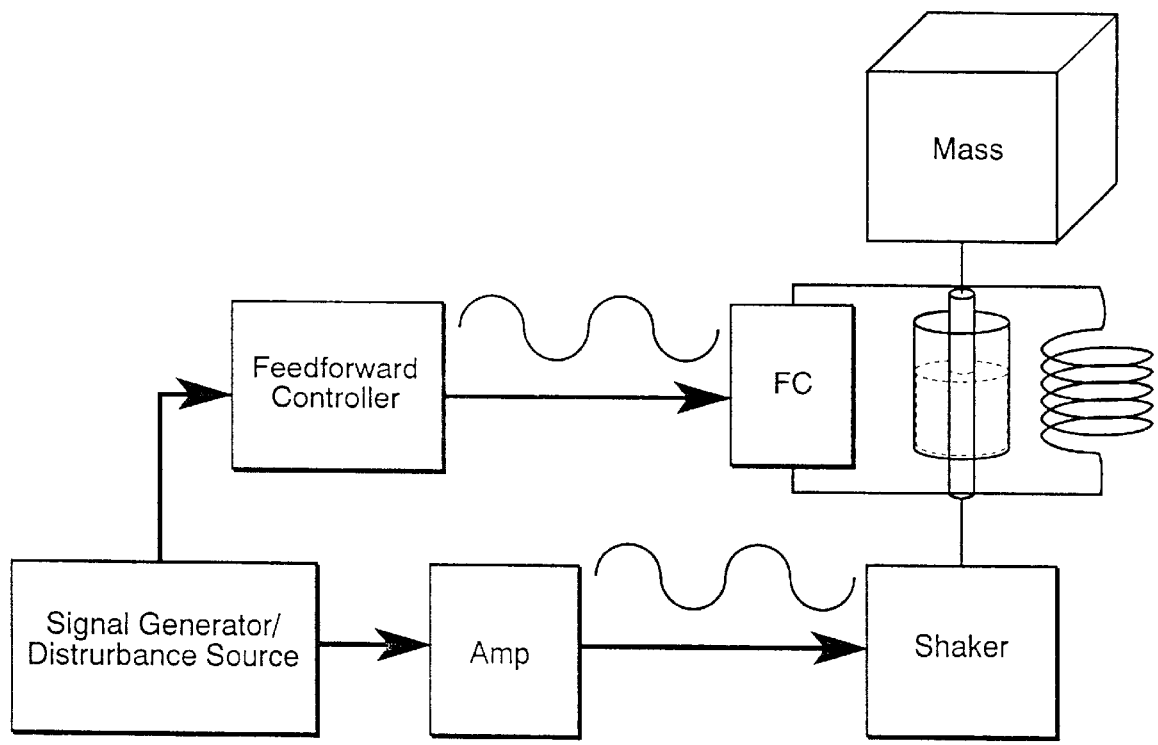
FIG. 7 is a block diagram the experimental hybrid control system.

FIG. 7 is a block diagram representation of the experimental hybrid control scheme. The feedforward controller is a low-pass filter used to cancel out the disturbance source being imparted to the system. The physical representation of this disturbance is shown in this figure by the sinusoid signal entering the shaker box. The controller cancels out this disturbance by applying an out-of-phase signal to piezoceramics on the isolator flexures represented by the sinusoid from the feedforward controller block.

We claim:

1. In combination with the whole-spacecraft passive isolation system consisting of a plurality of titanium flexures a generally rectangular each having attachment points projecting outwardly in the middle of top and bottom surfaces an opening between said top and bottom surfaces, said flexures being arranged in a ring that act as soft springs to isolate a satellite from its launch vehicle, the improvement which comprises:

a. a piezoceramic wafer attached to the top and bottom surfaces of each flexure on each side of the flexure attachment and located near the attachment point, said piezoceramic wafers being electrically connected in parallel; and b. a fourth-order, low-pass feed-forward filter controller means to pass appropriate out-of-phase electrical signals to said piezoceramic wafers to cancel out disturbances.

2. The hybrid isolation system of claim 1, whereby a linear quadratic gaussian controller is used to pass appropriate out-of-phase electrical signals to said piezoceramic wafers to cancel out disturbances.

3. The hybrid isolation system of claim 1, whereby a adaptive neural controller is used to pass appropriate out-of-phase electrical signals to said piezoceramic wafers to cancel out disturbances.

* * * * *